(12) United States Patent
Hill et al.

(10) Patent No.: US 12,417,638 B2
(45) Date of Patent: Sep. 16, 2025

(54) VEHICLE SECURITY DEVICE

(71) Applicant: Portable Multimedia Ltd, London (GB)

(72) Inventors: Ceri Hill, London (GB); Graham Lambert, London (GB); Sam Lewis, London (GB)

(73) Assignee: Portable Multimedia Ltd. (GB)

( * ) Notice: Subject to any disclaimer, the term of this patent is extended or adjusted under 35 U.S.C. 154(b) by 0 days.

(21) Appl. No.: 18/924,265

(22) Filed: Oct. 23, 2024

(65) Prior Publication Data

US 2025/0131728 A1    Apr. 24, 2025

(30) Foreign Application Priority Data

Oct. 23, 2023 (GB) .................................... 2316193

(51) Int. Cl.
| | |
|---|---|
| G06V 20/52 | (2022.01) |
| B60R 1/12 | (2006.01) |
| B60R 25/30 | (2013.01) |
| G01S 13/50 | (2006.01) |
| G06V 20/58 | (2022.01) |
| H04N 5/77 | (2006.01) |
| H04N 7/18 | (2006.01) |
| H04N 23/698 | (2023.01) |

(52) U.S. Cl.
CPC ................ G06V 20/52 (2022.01); B60R 1/12 (2013.01); B60R 25/305 (2013.01); G01S 13/50 (2013.01); G06V 20/58 (2022.01); H04N 5/772 (2013.01); H04N 7/181 (2013.01); H04N 23/698 (2023.01); B60R 2001/1223 (2013.01)

(58) Field of Classification Search
CPC ...... G06V 20/52; G06V 20/58; H04N 23/698; H04N 5/772; H04N 7/181; B60R 1/12; B60R 25/305; G01S 13/50

USPC ........................................................ 348/148
See application file for complete search history.

(56) References Cited

U.S. PATENT DOCUMENTS

| | | |
|---|---|---|
| 8,108,147 B1 | 1/2012 | Blackburn |
| 9,869,762 B1 | 1/2018 | Alland et al. |
| (Continued) | | |

FOREIGN PATENT DOCUMENTS

| | | |
|---|---|---|
| CN | 208867966 U | 5/2019 |
| CN | 215729920 U | 2/2022 |
| (Continued) | | |

OTHER PUBLICATIONS

International Search Report and Written Opinion, mailed Feb. 19, 2025, issued for International Patent Application No. PCT/GB2024/052704 (19 pages).

Primary Examiner — Nguyen T Truong
(74) Attorney, Agent, or Firm — Klarquist Sparkman, LLP

(57) ABSTRACT

An in-vehicle security device mountable to a surface to the rear of a rear-view mirror of a vehicle, comprising: a first image capture device configured to receive images in a first direction relative to the security device; a second image capture device facing a second direction, the second direction different from the first direction; and a first object detection module configured to detect the presence of an object exterior to a vehicle in which the security device may be mounted; wherein the first image capture device and second image capture device are arranged to begin capturing images and/or video responsive to the first object detection module detecting the presence of an object exterior to a vehicle in which the security device may be mounted.

20 Claims, 6 Drawing Sheets

(56) References Cited

U.S. PATENT DOCUMENTS

| | | |
|---|---|---|
| 10,328,947 B1 | 6/2019 | Hansel et al. |
| 10,421,437 B1 | 9/2019 | Koskan |
| 10,486,649 B1 | 11/2019 | Bennie et al. |
| 10,869,002 B2 | 12/2020 | Krökel |
| 10,899,316 B1 | 1/2021 | Moeller et al. |
| 11,448,750 B2 | 9/2022 | Chun et al. |
| 11,532,221 B1 | 12/2022 | Rogan et al. |
| 11,703,583 B1 | 7/2023 | Skeoch et al. |
| 11,780,405 B1 | 10/2023 | Bell |
| 11,972,669 B2 | 4/2024 | Rogan et al. |
| 2010/0198463 A1 | 8/2010 | Plaster |
| 2013/0135444 A1 | 5/2013 | Stein et al. |
| 2015/0278610 A1 | 10/2015 | Renner et al. |
| 2017/0309997 A1 | 10/2017 | Alland et al. |
| 2018/0367731 A1 | 12/2018 | Gatti et al. |
| 2019/0039517 A1 | 2/2019 | Hoyda et al. |
| 2019/0289282 A1 | 9/2019 | Briggs et al. |
| 2019/0293787 A1 | 9/2019 | Sakai et al. |
| 2019/0377814 A1 | 12/2019 | Shtrom et al. |
| 2020/0168014 A1 | 5/2020 | Uliyar et al. |
| 2020/0349723 A1 | 11/2020 | Geva et al. |
| 2021/0080561 A1 | 3/2021 | Wodrich et al. |
| 2021/0097315 A1 | 4/2021 | Carruthers et al. |
| 2021/0250554 A1 | 8/2021 | Liu et al. |
| 2021/0318135 A1 | 10/2021 | Chandupatla et al. |
| 2021/0341583 A1 | 11/2021 | Adams et al. |
| 2023/0077868 A1 | 3/2023 | Burns et al. |
| 2024/0210545 A1 | 6/2024 | Wagner |
| 2024/0212186 A1 | 6/2024 | Heinrich et al. |
| 2024/0253595 A1 | 8/2024 | Papanikolaou et al. |

FOREIGN PATENT DOCUMENTS

| | | |
|---|---|---|
| JP | 2022-034107 A | 3/2022 |
| KR | 2011 0112506 A | 10/2011 |
| TW | 1794075 B | 2/2023 |
| WO | WO 2007/042798 A2 | 4/2007 |
| WO | WO 2021/180865 A1 | 9/2021 |
| WO | WO 2022/141337 A1 | 7/2022 |

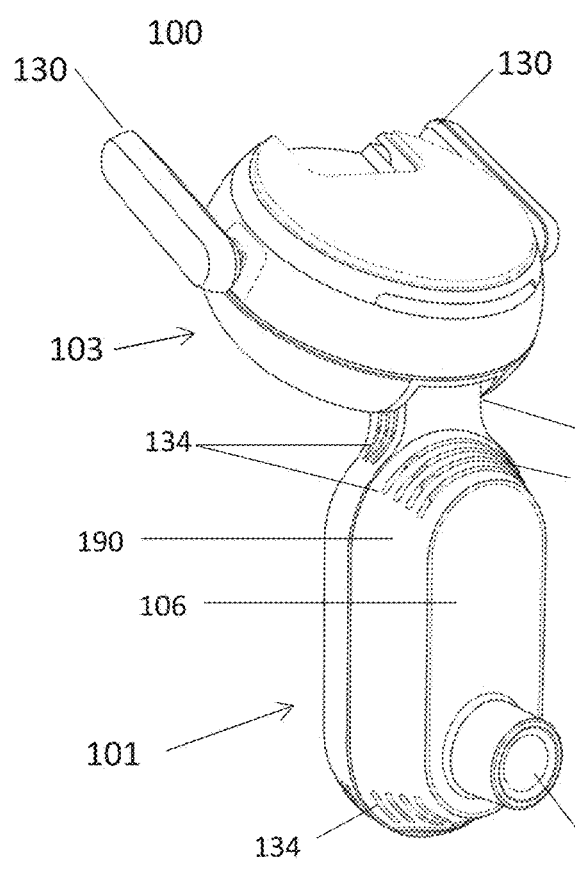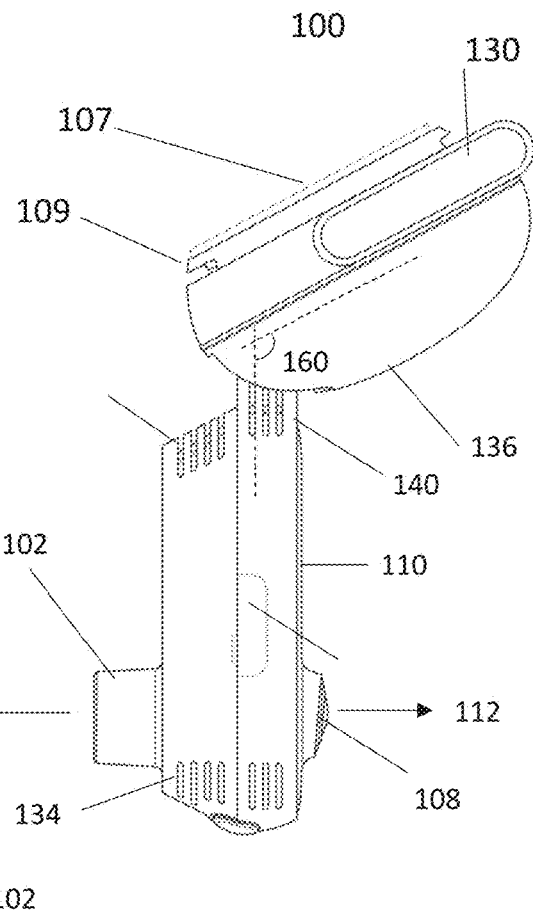
FIG. 3a
FIG. 3b
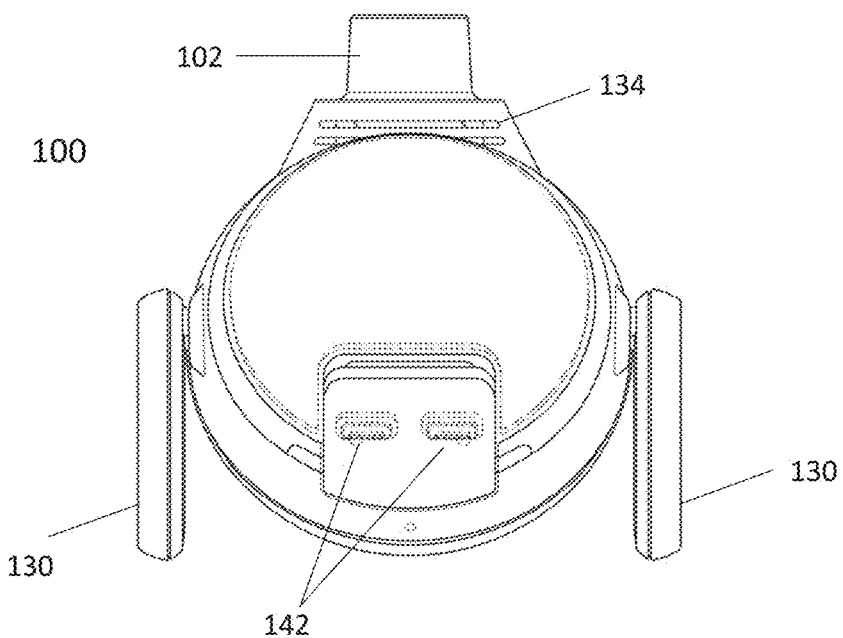
FIG. 3c

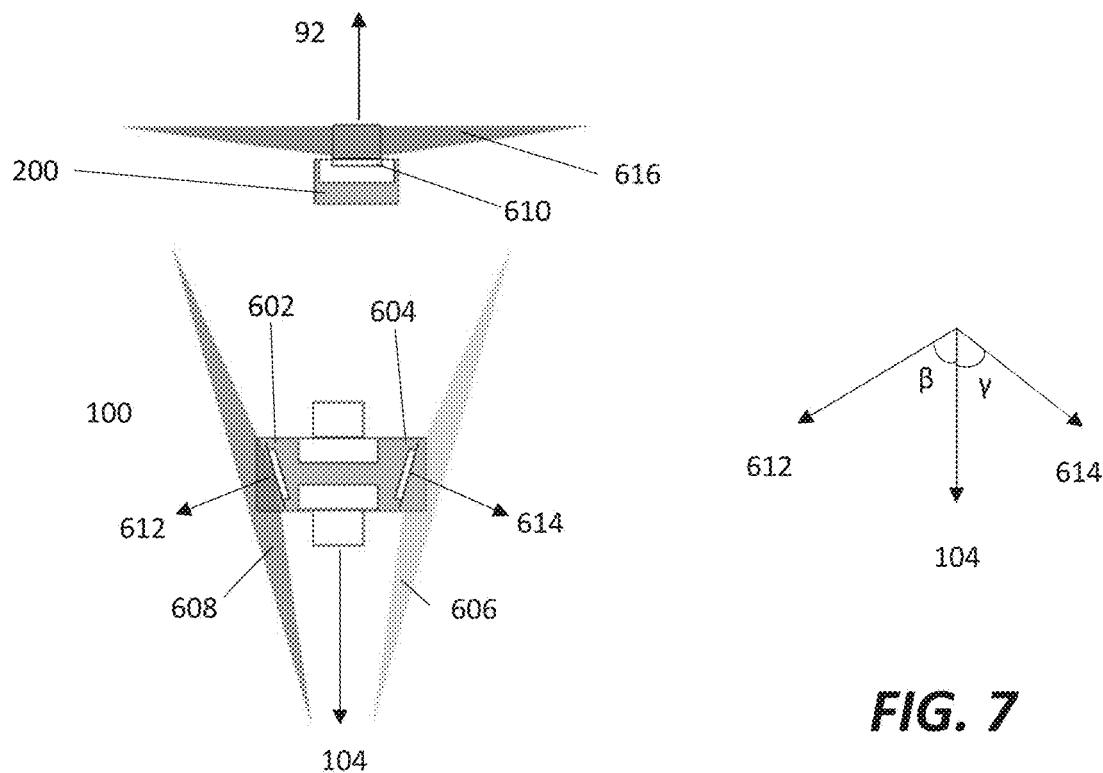
FIG. 6
FIG. 7
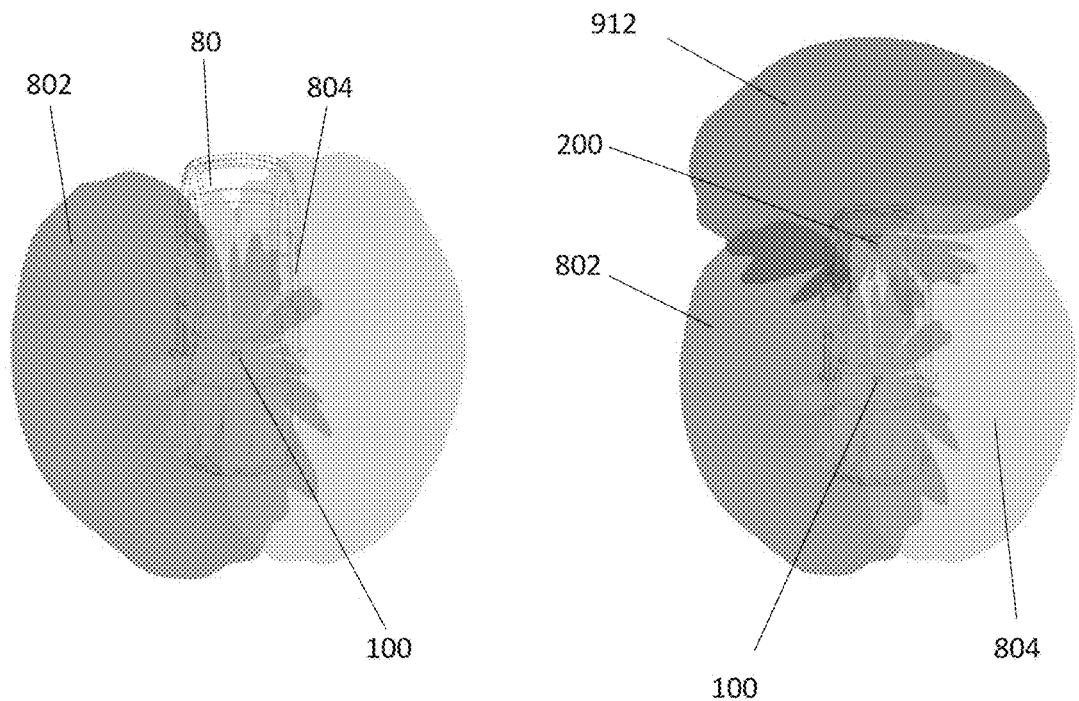
FIG. 8
FIG. 9

VEHICLE SECURITY DEVICE

CROSS REFERENCE TO RELATED APPLICATION

This application claims the benefit of United Kingdom Patent Application No. GB2316193.8, filed on Oct. 23, 2024. The prior application is incorporated herein by reference in its entirety.

FIELD

The present invention relates to a system for provision of a security camera, in particular but not exclusively to a vehicle security camera, that may be mounted within a vehicle.

BACKGROUND

In-vehicle cameras more generally in-vehicle digital video recorders (DVRs), sometimes referred to as "dashcams" because they are often situated on or adjacent a vehicle dashboard, are becoming increasingly common and are often installed into a vehicle after the overall vehicle has been manufactured, as an "after-sales" or "aftermarket" modification or personalisation of the vehicle by a user. Additionally, rear facing cameras are utilised and may be mounted adjacent or on a rear window of a vehicle to provide a field of view through the rear window of the vehicle.

Other examples of aftermarket products that may be used in vehicles are automotive head unit systems which provide processing capability to a variety of external, modular, peripheral sensors. Such peripheral devices include reversing sensors, screens, lights, radios, and other devices. These automotive head unit systems are separate, distinct units to the peripheral devices. They are often required to be fitted and calibrated by a professional technician and in some instances, modification to the vehicle is required to be made to accommodate the head unit. For example, some head units are mounted in the vehicle glove box or other discrete area within the vehicle and require holes to be drilled into the body of the vehicle in which is mounted. Such modification is non-reversible and will often deter users from installing such devices in the first place. Moreover, the requirement of a trained technician to install could also reduce the likelihood that a person would install such a device in their vehicle.

Typically, when the vehicle is in motion, dashcams will record video footage of the journey and provide some level of protection for the driver/user liabilities by recording adverse events. For example, in the event of a road traffic incident there will be video footage that might be used as in subsequent investigations. Increasingly, dashcam video footage is being used in some courts as evidence.

However, vehicles are also vulnerable to damage, break-in and theft when left unattended but dashcams are not routinely utilised when the vehicle is not in use and is stationary due to concerns about power consumption, the car battery being run down and the technical implementation thereof.

Aspects and embodiments in accordance with the present invention have been devised with the foregoing in mind.

SUMMARY

According to an aspect of the invention there is provided an in-vehicle security device for use in a vehicle, mountable to a surface to the rear of a rear-view mirror of a vehicle, comprising: a first part configured to be mountable to a surface to the rear of a rear-view mirror of a vehicle; a second part pivotably coupled to the first part; the second part comprising: a first image capture device configured to receive images in a first direction relative to the first part; a second image capture device facing a second direction, the second direction different from the first direction; and a first object detection module configured to detect the presence of an object exterior to a vehicle in which the security device may be mounted; wherein the first image capture device and second image capture device are arranged to begin capturing images and/or video responsive to the first object detection module detecting the presence of an object exterior to a vehicle in which the security device may be mounted; and wherein the second image capture device is arranged to comprise a field of view that extends beyond the rear view mirror into the cabin of the vehicle.

The interaction between the object detection module and the two image capture devices of the security device permits the use of the security device in a multitude of different power modes. For example, the object detection module provides for the two image capture modules to be switched off at certain times to minimise power consumption because the object detection module uses less power. If the object detection module detects the presence of a person within a security perimeter region of the vehicle, the device can begin recording images and/or video using either of the two object detection modules and increase the data captured.

Additionally, the second image capture device provides a field of view that covers the interior of the cabin of the vehicle in which it may be mounted while being able to be fixed to a surface behind a rear view mirror of the vehicle. For example, the security device may be mounted in a discreet place such as on a windshield of the vehicle and behind the rear view mirror and the second image capture device extends beyond the review mirror into the cabin of the vehicle. This minimises the footprint of the security device in the field of view of the driver of the vehicle and therefore minimise occlusion of the driver's view. At the same time, the second image capture device is capable of recording images and/or video in areas such as towards the sides of the vehicle and into the cabin. These side areas may be where an intruder is likely to attempt to enter the vehicle and recording images of this area is key to increasing the security of the vehicle.

Optionally, the in-vehicle security device comprises a second object detection and ranging module to detect the presence of an object exterior to a vehicle in which the security device may be mounted. This increases the field of view of the object detection capabilities of the security device and thus increases the region in which objects can be detected.

Optionally, the in-vehicle security device the first object detection module and the second object detection module are arranged to have overlapping fields of view with the field of view of the first image capture device. In the case where object detection modules having a roughly 180 degree range of detection is used, the overlapping of the fields of view of the two object detection modules provides a stronger signal in the region that they overlap. If the fields of view did not overlap then there would be gaps in the coverage of the object detection which result in "blind spots" of the object detection. The combined field of view of the object detection modules overlaps with the field of view of the first image capture device so that when an object is detected it may be recorded by first image capture device. Generally, if the first image capture device is directed towards the front of the vehicle in which it may be mounted, the object detection is improved in this direction also.

Optionally, the first object detection module is oriented at a first angle with respect to the direction of the field of view of the first image module and the second object detection module is oriented at a second angle with respect to the direction of the field of view of the first image module, the second angle being different to the first angle.

Optionally, the first angle and second angle are equal and opposite.

Optionally, the first object detection module and the second object detection module both each comprise at least one signal transmitter operative to emit an object ranging signal; and at least two signal receivers for each at least one signal transmitter operative to receive a reflection of the emitted object ranging signal; wherein the at least one signal transmitter and the at least two signal receivers for each at least one signal transmitter are disposed relative to each other to reduce reflection of the transmitted object ranging signal from a surface of a protective member proximal the at least one signal transmitter that the transmitted signal travels through.

Optionally, the security device further comprises an external housing and the signal transmitters are arranged so as to minimise occlusion of the signal by features of the housing. The object detection signals may be attenuated by features of the housing such as ribs, corners, and chamfers and so minimising this provides for a stronger signal being transmitted and therefore received by the object detection modules.

Optionally, the signal transmitters are arranged to be at a distance from the inner surface of the housing so as to minimise destructive interference of the signal by the housing. Destructive interference of the object detection signal is minimised by arranging the signal transmitters at a distance so that any internal reflections of the signal does not destructively interfere with the emitted object detection signal. Thus, a stronger signal is emitted, and object detection is improved.

Optionally, the distance is 0.6 mm. This distance is optimal for the type of object detection modules used in the security device.

Optionally, the in-vehicle security device is configured to be connected to a second device such that image data and motion data captured on the second device is transferrable to the first device. The capability to be coupled to a second, auxiliary device allows data to be shared between the two such devices and provides a region in and around the vehicle in which security threats can be detected. This means 360 degree motion detection around the vehicle is provided.

Optionally, the motion detection and ranging module is a RADAR module. RADAR modules provide object detection and ranging capabilities which allows the security device to accurately detect the presence and location of an object, such as a person approaching the vehicle when it is stationary.

Optionally, the in-vehicle security device comprises an inertial measurement unit. This provides for detection of movement of the vehicle such as when a person is attempting to break into the vehicle or lift if up to remove valuable components underneath the vehicle. The movement of the vehicle may be an indication of a security risk to the vehicle.

Optionally, the in-vehicle security device is configured to be operative in either a high power state or a lower power state responsive to an indication of a security threat by the inertial measurement unit. An advantage of this may be that the security device could be in a low power mode while stationary so as to conserve energy usage (i.e., not activating the video devices/cameras) but be 'woken' if the inertial measurement unit detects movement of the vehicle.

Optionally, the in-vehicle security device further comprises a memory device and/or a data transfer unit; and wherein the device stores measurement data from the first image capture device, second image capture device, and the object detection modules on the memory card and responsive to the indication of a security threat, transmitting the data to an external device. The security device may be arranged to store data recorded onto a memory device, such as a memory card and when the inertial measurement unit detects a security threat, transmitting the data via the data transfer unit, such as a 4G transmitter, to an external device.

Optionally, the second image capture device of the first device is a wide-angle lens. The wide-angle lens provides a field of view that covers not only the interior of the cabin area of the vehicle, but the external areas of the vehicle such as through the side windows. This means video and/or images of a person approaching the side of the vehicle can be captured.

Optionally, the in-vehicle security device is configured to be pivotably mountable to a surface to the rear of a rear-view mirror of a vehicle. This provides for angle adjustment of the device relative to the mounting surface, such as a windscreen, which increases the flexibility of mounting positions and locations.

In a second aspect of the present invention there is provided a mount attachable to a surface to the rear of a rear-view mirror of a vehicle and configured to provide pivotable coupling of an in-vehicle security device according to the first aspect to the mount.

In a third aspect of the present invention there is provided an assembly, comprising a mount according to the second aspect and an in-vehicle security device according to the first aspect pivotably mounted to the mount, In a fourth aspect of the present invention there is provided a vehicle comprising the security device of the first aspect.

BRIEF DESCRIPTION OF THE DRAWINGS

One or more specific embodiments in accordance with aspects of the present invention will be described, by way of example only, and with reference to the following drawings in which:

FIGS. 3a, 3b, and 3c illustrate different orthographic views of a first device of the in-vehicle security system according to one or more embodiments of the present invention;

FIG. 6 is an illustrative overhead schematic view of the first and second device of an in-vehicle security system according to one or more embodiments of the present invention;

FIG. 7 is a schematic diagram showing the axes of direction for FIG. 6.

FIG. 8 is an overhead view of a vehicle showing one or more RADAR footprints according to one or more embodiments of the present invention;

FIG. 9 is an overhead view of a vehicle showing one or more RADAR footprints according to one or more embodiments of the present invention.

DETAILED DESCRIPTION

Figure 1:
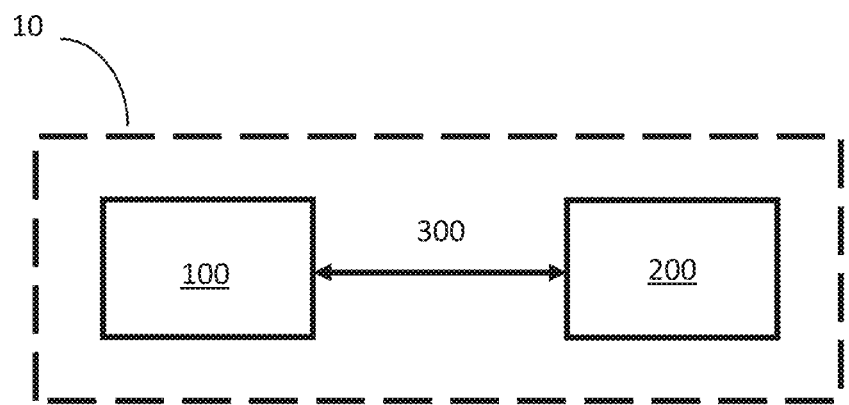
FIG. 1 illustrates a general overview of an in-vehicle security system according to one or more embodiments of the present invention.

FIG. 1 is an illustrative schematic diagram showing a general overview of a security system 10 that is for use in a vehicle such as a car, according to an embodiment of the invention. It will be referred to as "security system 10" hereinafter. The security system 10 comprises a first device 100 electrically connected by a wired connection 300 to an optional second device 200. The wired connection 300 is a removeable electrical connection meaning that the first device 100 and the second device 200 can be removably connected to each other.

The wired connection 300 between the first device 100 and the second device 200 comprises an electro-mechanical coupling, mechanical in so much as the wireless connection is terminated with an electrical connector mechanically engageable with respective devices 100, 200, for example by way of friction between connection pins and corresponding sockets, to permit the transfer of data and power between the devices. When coupled to the first device 100, the second device 200 receives power from the first device 100 via the electro-mechanical coupling 300 and can transfer data that it captures to the first image 100 via the electro-mechanical coupling 300.

The security system 10 in general comprises one or more sensors capable of video recording, audio recording, acceleration sensing and radar detection in a single "aftermarket" system which can be retro fitted into a vehicle. The sensors that are used to achieve such capabilities are configured to capture the respective data from within the vehicle (for example the cabin) and from the exterior region around the vehicle. Such an exterior region may extend for several metres away from the exterior surface of the vehicle in order to monitor its immediate environment similar to a security perimeter region. The extent of the exterior region is a matter of design choice but the skilled person should take into account a sufficient extent to detect potential threats to the vehicle but minimising false positives due to the normal movement, such as pedestrian, cyclist or other vehicle traffic, of objects that may be passing the vehicle.

In this regard, the exterior region may extend for up to several metres from the vehicle body. For example, the exterior region may extend up to around 1 m if only the close proximity of the vehicle is to be monitored such as when the vehicle is parked in a road and other vehicles and pedestrians are likely to be passing by; optionally, in an environment in which there is likely to be less passing vehicle or pedestrian traffic such as in a car park and exterior region extending up to 2 m to 3 m or thereabouts would be suitable. If the car is left a stationary and in an open area a great exterior region such as extending beyond 3 m to 10 m or even a greater number of metres may be suitable.

One or more embodiments in accordance with the present invention may provide options for user to select the extent of the exterior region, for example depending upon the environment in which the vehicle is to be left stationary.

Positional Definitions

Figure 2:
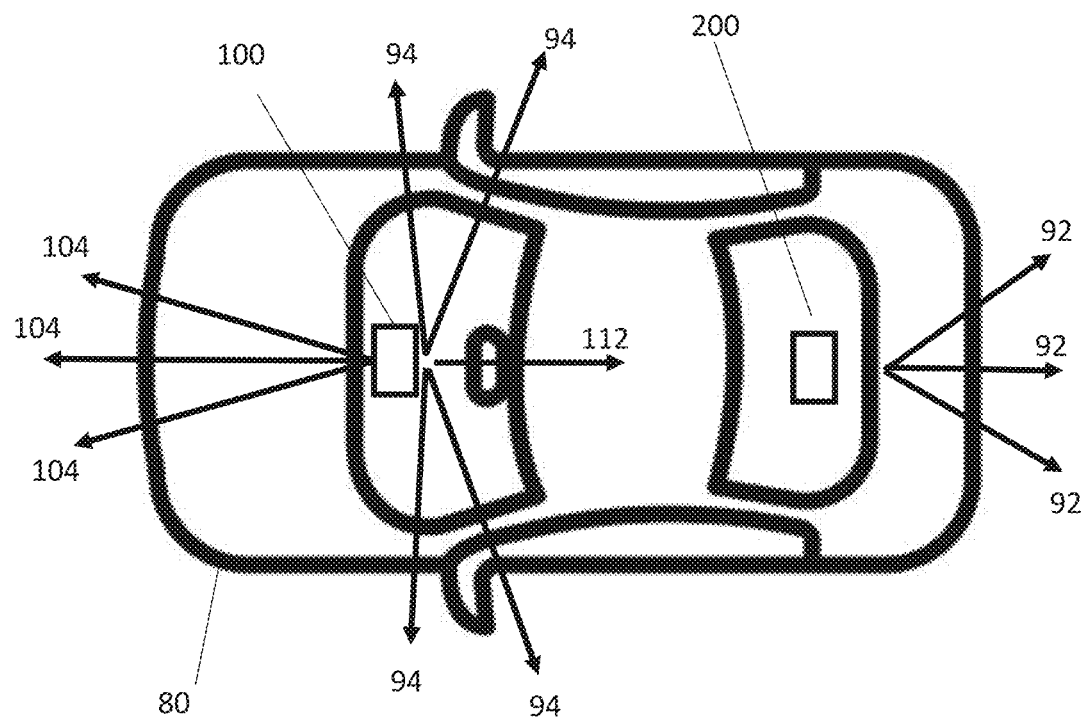
FIG. 2 illustrates a vehicle when viewed from above in a plan view according to one or more embodiments of the present invention.

To assist the understanding of the location in which the first device 100 and the second device 200 may be located in a vehicle, reference is made to FIG. 2, which is an illustrative diagram of a car 80 when viewed from above. The first device is located in the forward section of the car 80 with its front face (not shown) facing the direction indicated by arrow 104 towards the external area in front of the vehicle to which it may be mounted. The rear face of the first device 100 opposite the front face (not shown) is facing the direction indicated by arrow 112 towards the internal area of the car, which is sometimes referred to the cabin area or cabin direction. The rear device 200 is mounted in the rear of the car 80 and its front face (not shown) facing the direction indicated by arrow 92 which is toward the external area behind the car 80.

First Device 100

FIGS. 3a, 3b, and 3c are illustrative line drawings showing external elements of the first device 100 when viewed from different perspectives, according to an embodiment of the invention. The first device 100 is described with reference to these figures.

The first device 100 is a dashcam type device that is comprised of a lower, pendant portion 101 which is pivotably coupled by a connection point 105 to a circular mounting end 103. The mounting end 103 of the device 100 is configured to be fixed to a windscreen of a vehicle (not shown in these figures) with the angle adjustment of the pendant portion 101 achieved by pivoting about a connection point 105. The mounting portion 103 can be affixed to a windscreen by a sticky pad 107, such as a 3M™ sticky pad. The sticky pad 107 is generally considered non-removable, but if a user desires to remove the first device 100, they may do so by way of the removable section 109 of the mounting end 103. The first device 100 can be released or decoupled from the removable section 109 by a sliding motion (not shown) which leaves the sticky pad 107 fixed to the windscreen.

The mounting end comprises the components that requires good view of the sky above the vehicle, such as a 4G/LTE module and a GPS module.

When in use, the pendant portion 101 is maintained such that a first image capture device 102 is facing the horizon in a direction 104 towards the external area in front of the vehicle to which it may be mounted. The inclination angle of vehicle windscreens is known to vary depending on the vehicle. For example, busses and lorries are likely to have an inclination angle close to 90 degrees relative to the ground, whereas cars, and especially sports cars will be around 45 degrees to 70 degrees. To accommodate for this variation, the pivot angle 160 between the pendant portion 101 and the mounting end 103 can move in a range of 90 degrees. One extreme is where the front face 106 of the first device 100 is substantially parallel to the plane of the sticky pad 107; the other being when the front face 106 of the first device 100 is perpendicular to the plane of the sticky pad 107 (i.e., the angle α shown in FIG. 3b is approximately the midpoint of the 90 degree range.

The pivotable nature of the pendant portion 103 relative to the mounting portion/end 103 permits the device 100 to be mounted in a wide range of different vehicles while maintaining good visibility of the horizon of the external area in front of the vehicle.

As previously mentioned, the first device 100 is a dashcam device that comprises a first image capture device 102

(sometimes referred to as "first camera 102") on the front face 106 of the device 100 and faces a first direction 104 away from the front face 106 towards the external area in front of a vehicle which may be mounted. The first camera 102 is capable of recording image data and video data up to 4K resolution and in the direction 104 with a field of view of 125 degrees.

The first device 100 additionally comprises a second image capture device 108 (sometimes referred to as "cabin camera 108" or "second camera") which is located on the rear face 110 of the device 100 and faces the second direction 112. The cabin camera 108 generally faces toward the inside 112 of the vehicle in which it is mounted. The cabin camera 108 is a wide-angle, 1440 P resolution lens with a field of view of approximately 190 degrees which enables image capture and video recording of the cabin as well as the external area to the sides of the car (as indicated by arrows 94 in FIG. 2). As can be seen in FIG. 3b, the cabin camera 108 is angled downwardly with respect to the axis of the first camera 102. The cabin camera 108 is located towards the lower end of the pendant portion 101 (i.e., at a point furthest away from the mounting end 103) so as to be as close to the centre of the windscreen as possible while not occluding the field of view of the driver. The effect of positioning the cabin camera 108 as far down in the vertical direction as possible is to ensure that its field of view is not occluded by the rear-view mirror of the vehicle. Additionally, the lower the position of the cabin lens 108, the wider the field of view outside of the vehicle can be. This is due to the fact that the field of view will not be occluded by the framework of the side doors thus allowing the device 100 to capture images and video of a person approaching the side of the vehicle. It will of course be appreciated that increasing the coverage of the sides of the cabin area, i.e., the doors and side windows, will improve the ability of the security device to detect and record the presence of someone trying to break into the vehicle via those routes.

As will be appreciated, the figures show the external lens or external lens tube of the first image capture device 102 and the second image capture device 106 only. As part of the two image capture devices, there will be other components not shown in the diagrams such as a digital image capture sensor, focusing elements such as lenses, filters, and other optical elements. Examples of digital image capture sensors that may be used are CCD chips or CMOS sensors.

The first device 100 also comprises one or more air vents 134 to facilitate the ingress and egress of air into the device housing as a form of convective heat management. Other or additional forms of heat management within the first device 100 may be heat sinks or cooling fins (not shown).

In some embodiments, there may also be a speaker 136 located in the mount portion 103 capable of speech over the background noises while the vehicle is in motion to provide warnings to a person located in the vehicle, or to a would-be intruder. The first device may also comprise a memory card slot 140 to allow removable insertion of electronic data storage devices, such as SD™ cards, flash memory cards, or other electronic data storage devices.

Second Device 200

Figure 4A:
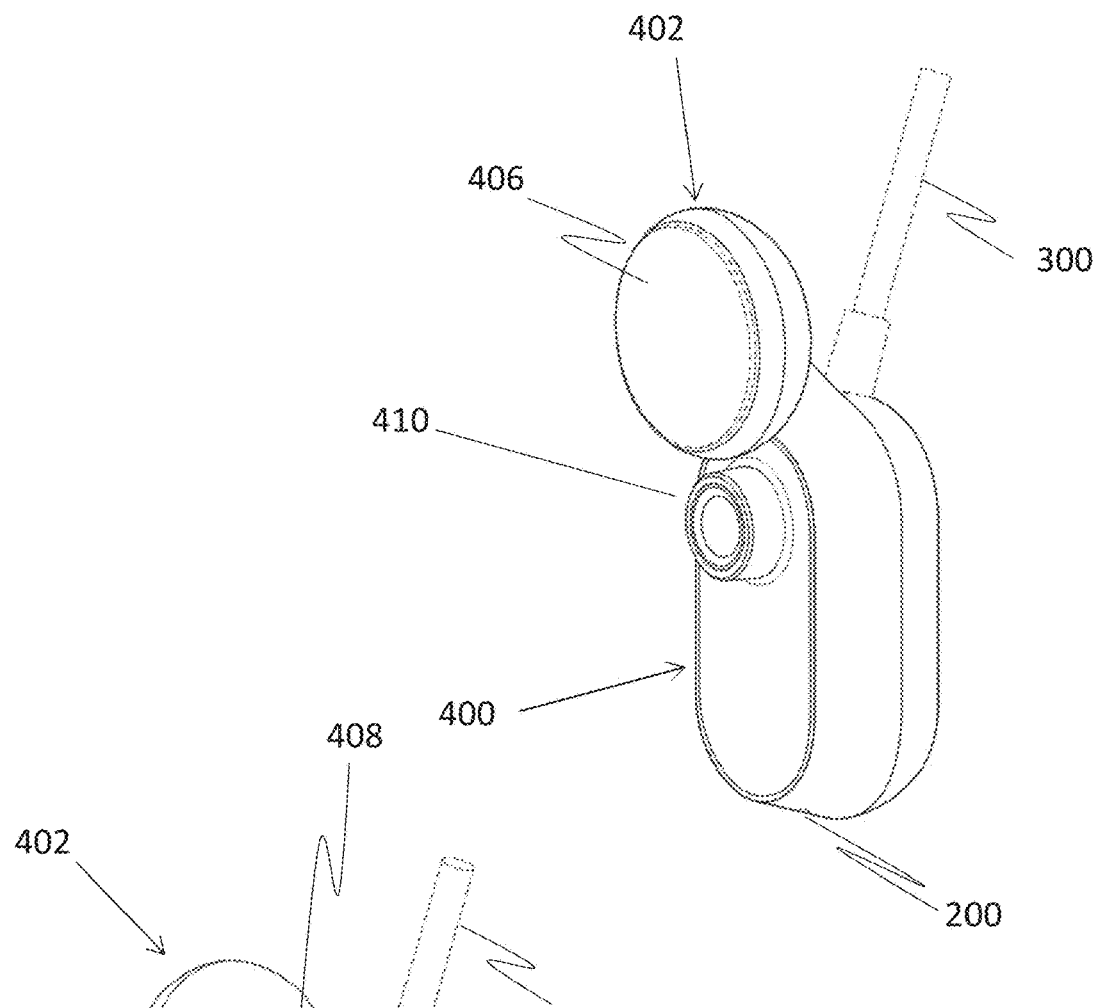
FIG. 4a, and 4b illustrate different orthographic views of a second device of the in-vehicle security system according to one or more embodiments of the present invention.
Figure 4B:
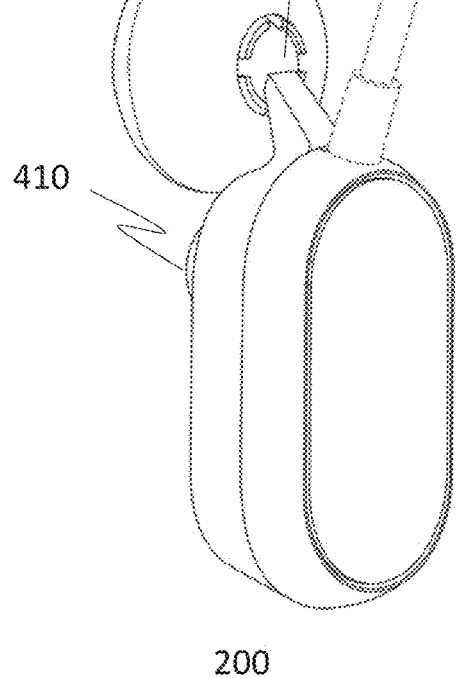

FIGS. 4a and 4b are illustrative schematic line drawings showing external elements of the second device 200 when viewed from different perspectives, according to one or more embodiments of the invention. The second device 200 of the security system 10 is described with reference to these figures.

As mentioned in the description of FIG. 1, the second device 200 is an optional auxiliary device that is in a wired electrical connection with the first device 100. The second device 200 comprises a lozenge shaped portion 400 that is pivotably connected to a circular mount portion 402. The mount portion 402 is similar to the circular mounting end 103 of the first device 100; it comprises a sticky pad portion 406 to affix the mount to a support structure, such as a rear windscreen (not shown). The lower, lozenge portion 400 is moveable relative to the mount portion to allow a user to adjust the field of view accordingly. The movement is provided by a 'ball and socket' joint 408, which is substantially similar to the arrangement described in UK patent application numbers GB2582140A1 and GB2581850A1, and UK patent publication number GB2581851B1.

The second device comprises a third image capture device 410 (sometimes referred to as "the third camera 410" or "rear facing camera") which is capable of capturing images and recording video. When mounted in a vehicle, the third image capture device 410 faces a direction 92 towards an external area at the rear of the vehicle (as seen in FIG. 2). Thus, it provides a view towards the rear of the vehicle. In one embodiment, the image capture device 410 has 1440P resolution with a field of view of 125 degrees.

As mentioned in relation to FIG. 1, the second device 200 is removably connectable to the first device 100 by way of a wired connection. This can be seen in truncated form in FIG. 4b as indicated by reference numeral 300.

When connected to the first device 100, the first camera 102, the cabin camera 108, and the third camera 410 form a multi-directional camera assembly providing views substantially around the entire external area and within the cabin area of the of the vehicle in which it may be mounted, i.e., a 360 degree range around the vehicle. Images and videos captured on the rear camera device can be transferred to the front device via the wired connection 300 for storing and further processing.

Security System Components

Figure 5:
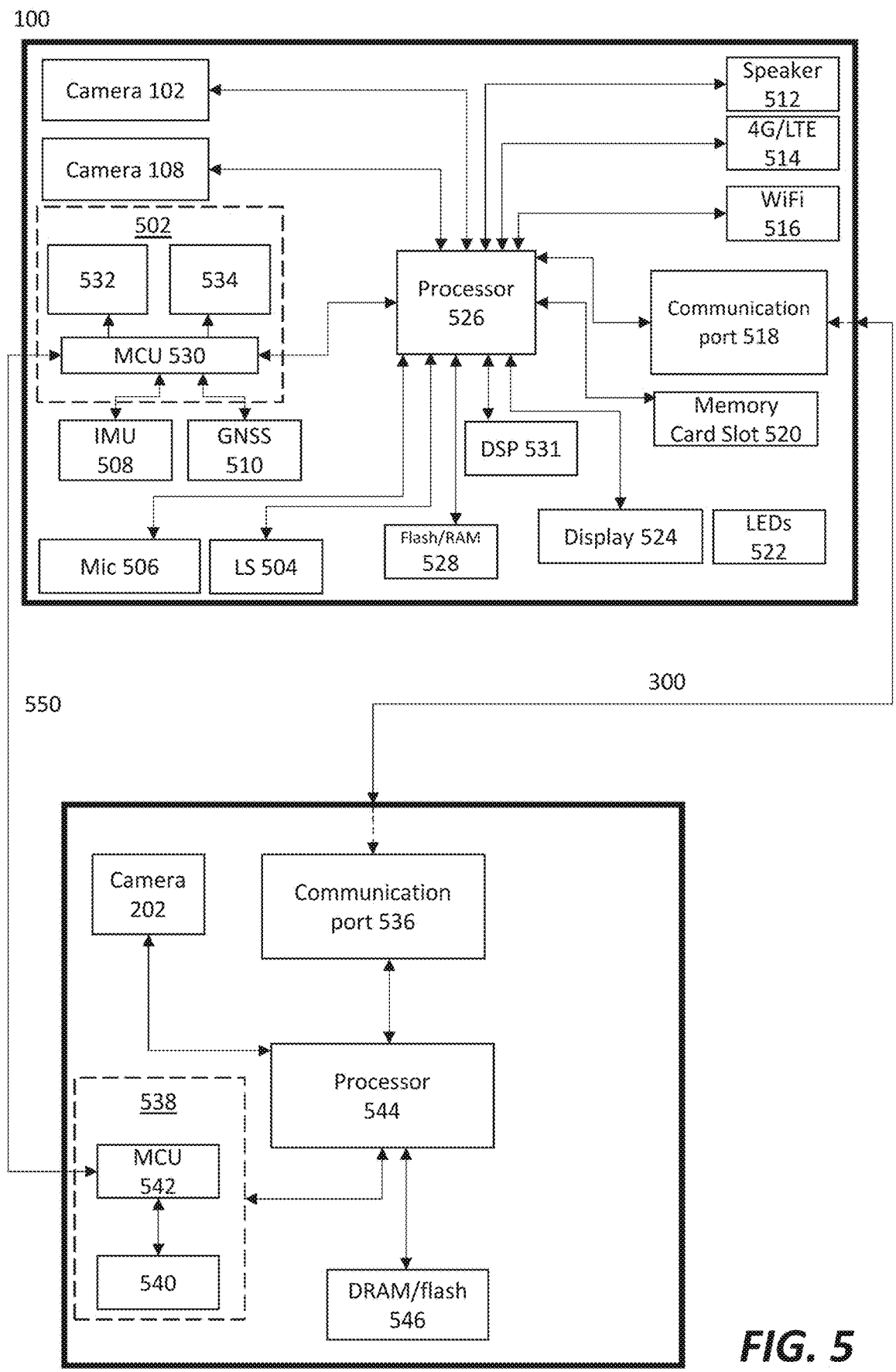
FIG. 5 is an illustrative block diagram of a first device and a second device of an in-vehicle security system according to one or more embodiments of the present invention.

FIG. 5 is an illustrative block diagram showing the internal and external components of the security system 10 in more detail. In the figures the arrows indicate the data and or power connection between the components. As previously described with reference to FIG. 1, the security system 10 comprises the first device 100 and the second device 200. In a general overview, the lefthand side of FIG. 5 comprises the input components/sensors of the first device 100. In this embodiment, the first device comprises the front camera 102, the rear camera 108, a motion detection and ranging module 502, a light sensor 504, a microphone unit 406, an inertial measurement unit (IMU) 508, and a global navigation satellite system (GNSS) receiver 510. The output components/interfaces are shown on the righthand side of FIG. 5, comprising but not limited to: a speaker output 512, 4G/LTE module 514, a WiFi module 516, a communication port 518, removable memory card slot 520, and LEDs 522. The first device additionally comprises various internal components such as a processor 526, an internal memory 528 such as RAM or FLASH, and a digital signal processor (DSP) 531.

The motion detection and ranging module 502 additionally comprises a microcontroller unit (MCU) 530 which is in electrical connection with the processor 526, the IMU 508, and the GNSS receiver 510. The MCU 530 controls a first radar unit 532 and a second radar unit 534, both of which are designed to detect motion, speed, angle, and location of an object exterior to the vehicle to which is the first device 100 is mounted. Each of the first radar unit 532 and the second radar unit 534 ("radar units") both comprise one radar transmitter and two radar receive antennas (not shown). The radio transmitter of each radar unit operates at 24 GHz and uses triangular chips on linear frequency modulation (commonly called LFMCW) to allow for accurate radial distance measurements. The two radar receive antennas in each of the radar units are situated in different spatial locations of the first device 100 so as to provide sufficient parallax between respective pairs of radar receivers. This allows the radar units to be able to detect the distance of an object. Additionally, the two receive antennas allow for phase difference angle estimation, which in-turn will provide sufficient data resolution to generate a 2D plot around the vehicle (see example shown in FIGS. 8 and 9, which is described in more detail below).

The IMU 508 is used to detect movement of the vehicle when stationary or when it is driving. When stationary, the IMU 508 can detect motion of the vehicle such as when a person is attempting to break into the vehicle or lift if up to remove valuable components underneath the vehicle. The advantage of this is that the security device could be in a low power mode while stationary so as to conserve energy usage (i.e., not activating the video devices/cameras) but be 'woken' if the IMU 508 detects movement. Once the security device detects a movement of the vehicle, the cameras and object detection, which consume much higher power, could be activated to record the event. Another option is that while in a lower power mode, the radar antennas could be operated to provide object detection around the vehicle which is then transmitted to a remote user device via a 4G connection upon the IMU 508 detecting movement. This would be indicative of a security threat.

The radar antennas can be seen in FIG. 3a, FIG. 3b, and FIG. 3c indicated by numeral 130 and are movable so as to provide flexibility depending on mounting conditions. For example, they may be rotated 90 degrees to accommodate objects such as rear-view mirrors and the like. The distance between the two antennas is set depending on the frequency of the transmitters. In some embodiments the distance is 60 mm so as to enable large enough ground plane to ensure optimal performance.

The first device 100 is connected via the communication port 518 by wired connection 300 to a similar communication port 536 on the second device 200 (as seen in FIG. 6). The wired connection is indicated by the line 300 between FIG. 5 and FIG. 6 and can also be seen in FIG. 4a and FIG. 4b. In the example of this embodiment, the second device is connected to the first device via a USB connection (seen as 142 on FIGS. 3a-c).

Similar to the first device 100, the second device 200 of the security system 10 also comprises a motion detection and ranging module 538. The module 538 further comprises the radar module 540 which is controlled by an MCU 542. The third radar module 540 assists in providing a 360-degree motion detection and ranging coverage around the entire vehicle (see example shown in FIG. 7, which is described in more detail below). In general use, the second device is controlled by a processor 544 but when in a stationary, lower power mode, the MCU 542 controls the radar module 540 via a communications channel 550. The communication channel 550 may be part of the wired connection 300. In this embodiment, the MCU 542 directly communicates to the MCU 530 while in any low power mode so as to "wake up" the security system if any motion is detected.

The third radar module 540 also comprises one radio transmitter and two radio receiver antennas (not shown in this image) that are similar to the ones described in relation to FIG. 5 and motion detection and ranging module 502.

Additionally, the second device 200 comprises an internal memory 546 such as DRAM or FLASH.

Location and Angle of RADAR Transmitters

One of challenges of mounting radar transmitters and receivers inside of vehicles is dealing with the presence of obstructions such as the window pillars, seats, and other parts of the vehicle structure. This blocks the radar signals and thus results in blind spots in any 2D map generated by the three radar transmitters described previously.

FIG. 6 is an illustrative diagram of the first device 100 and second device 200 when viewed from above according to one or more embodiments of the present invention; note that the image is not to scale and the shape of the device is not accurate and not intended to be limited as such. The image shows an example of the relative positioning of the two devices when in use so as to demonstrate the orientation of the radar transmitters. Specifically, it shows a first radar transmitter 602 of the first radar unit 532 and the second radar transmitter 604 of the second radar unit 534 overlayed on the shape of the housing and relative to the front facing camera. The transmitters are overlayed on the shape of the devices so as to provide an illustrative example only; no other internal components are shown. The orientation of the first radar transmitter 602 and the second radar transmitter 604 is configured such that when the front face of the camera is facing through the front windscreen of a vehicle (indicated by arrow 104), the field of view of the two transmitters covers the front and sides of the vehicle 80.

This is achieved by orienting the first radar transmitter 602 and the second radar transmitter 604 so that the front face of the transmitter is an angle less than 90 degrees relative to the direction 104 towards the external area in front of the vehicle to which it may be mounted. This is shown by arrows 612 and 604 which are perpendicular to the front face of the first radar transmitter 602 and second radar transmitter 604 respectively; both of the lines 601 and 604 are at an angle less than 90 degrees relative to the forward-facing direction 104. For clarity, this is shown in FIG. 7 with the angles β and γ, which are less than 90 degrees relative to the direction 104. A particular angle would be 60 degrees relative to the direction 104. The results in the strongest signal being directed towards the exterior of the vehicle and not into the interior region of the cabin area 112. The strongest signal is generally in the middle of the field of view of the transmitters.

This is contrary to current prejudices where a person skilled in the art would be inclined to mount the two radar transmitters back-to-back in order to achieve the maximum field of view. That is, so that the front planes of the transmitters are at 180 degrees relative to each other. However, depending on the orientation of the two back-to-back transmitters this means that the strongest signal or each transmitter would either be directed towards the window pillars of a vehicle or toward the front area 104 and the cabin area 112 of the vehicle. As will be appreciated, either situation is not desirable because the number of obstacles will increase the blind spots of the security system. Moreover, arranging the transmitters back-to-back means there will be limited signal strength at the periphery of the field of views, resulting in weak motion detection in those areas. Having an overlap of the fields of view by the angles as described obviates all of these issues.

The resultant radar coverage is shown in FIG. 8, which shows the car 80 that was previously described with reference to FIG. 2 overlayed with illustrative fields of view of the radar signal. When the first device 100 is mounted in the front of the vehicle as shown in the figure, the coverage from the first radar transmitter 602 is shown as a field of view 802 and the coverage from the second radar transmitter 604 is shown as a field of view 804 (or alternately as a security perimeter region). The relative orientations of the first radar transmitter 602 and the second radio transmitter 604 provide a 2D map around the front and sides of the vehicle. This allows the first device 100 alone to detect the presence of objects that fall within the combined footprint of both radar transmitters. The angle orientation of the two transmitters allows sufficient overlap of the two fields of view at the periphery regions in front of the vehicle so that objects can be detected sufficiently far away from the front of the vehicle. As described, it also results in minimal radar signal strength being directed into the cabin region of the vehicle which is may be mounted in.

Returning now to FIG. 6, the second device 200 is shown as if it is mounted so that its front face is directed opposite to the first device 100 and in the direction toward the rear of the vehicle to which it may be mounted (see arrow 92 and the description of FIG. 2 for more discussion of the relative positions the two devices may be mounted in a vehicle). As mentioned with reference to FIG. 5, the third radio module 540 comprises a radar transmitter 610 which transmits signals in the direction 92 away from the rear of the vehicle. This is shown by the triangle shape 616.

When the second device 200 is optionally added to the security system 10, the resultant radar coverage provided by the three transmitters (602, 604, and 610) is around the entire external area of the vehicle, forming a perimeter security region as shown in FIG. 9. This is similar to FIG. 8 and like features are represented by like reference numerals. The additional radar footprint 912 provided by the radio transmitter 710 of the second device 200 means that objects which are to the rear 92 of the vehicle will be detected; this provides the user with 360 degree object detection and ranging coverage around the entire external area of the vehicle by ensuring that the fields of view of all radar transmitters are overlapping. The range of the security perimeter region is up to several metres, for example, 5 metres.

Another problem with mounting radar transmitters in the first device 100 and second device 200 is occlusion of the transmitted radar signal by the device itself, either by its housing or by the internal components. In order to address this problem, one embodiment of the present innovation is to mount the radio transmitters (602, 604, and 610) close to the housing of the respective devices which they are mounted in. In one embodiment, the transmitters are placed to be 0.6 mm from the inside face of the device housings. Referring back to FIGS. 3a-c, the front face 106 of the housing of the pendant portion 101 of the first device 100 comprises a chamfered region 190 to match the previously mentioned angle (β, γ) of the transmitters while maintaining the 0.6 mm distance between the inner surface of the housing and front plane of the transmitters, i.e., the two surfaces oppose one another.

Relative Position Between RADAR Receivers and RADAR Transmitters

Figure 10:
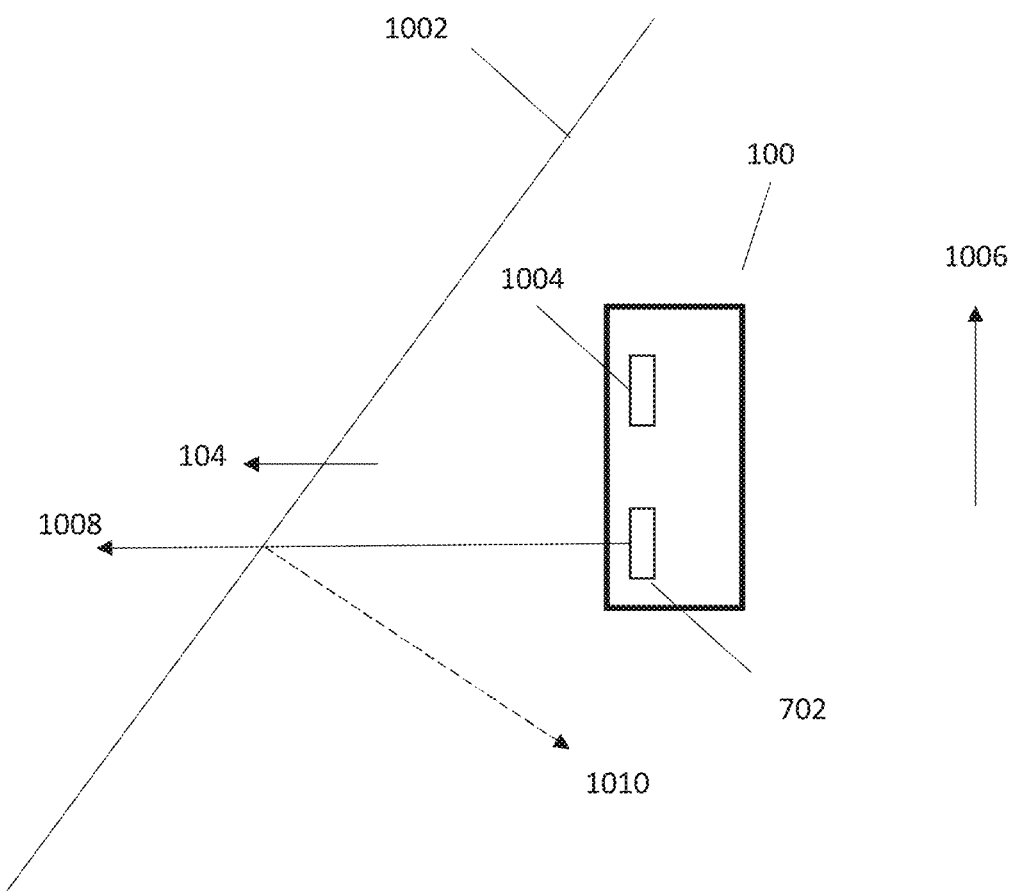
FIG. 10 is an illustrative diagram showing relative positions of some components of the first device of an in-vehicle security system according to one or more embodiments of the present invention.

FIG. 10 is an illustrative sketch showing the relative positions of the radar transmitters 702 and a radar receiver antenna 1004 in the first device 100, which is shown side on and relative to a windscreen 1002 according to another embodiment. The arrow 1006 indicates the direction towards the top of a vehicle in which the first device 100 may be mounted, i.e., gravity is in the opposite direction. This diagram is not to scale, and angles may vary.

In this particular embodiment, the first radar transmitter 702 is vertically below one of its respective pair of radar receiver antennas 1004. The radar signal 1008 is transmitted by the first radar transmitter 702 in the direction 104 toward the front exterior of the vehicle and passes through the windscreen 1002. A portion of the radar signal 1008 that is incident on the windscreen 1002 surface will be reflected into the interior of the vehicle at an angle equivalent to the angle of incidence and transmitted according to Snell's law. This is the so-called back reflection which is indicated by dashed arrow 1010 (referred to as back reflection 1010 herein). Due to the nature of vehicle windscreens, it is very unlikely that there will be any windscreen inclination angles that are greater than 90 degrees (i.e., the top edge of the windscreen leaning forward over the lower edge of the windscreen). Therefore, positioning the radar transmitter 702 vertically below any radar receivers 1004 will ensure that the back reflection 1010 is not incident on the radar receiver 1004. The reason being is that due to the inclination angle of the windscreen, the back reflection 1010 will be directed below the radar 702 transmitter. That is, in the direction indicated by arrow 1010. Provided the radar receiver is located vertically above the transmitter 710, the effect of minimising back reflections incident on the radar receiver 1004 will always be true.

The particular advantage of this positional arrangement between the radio transmitter 702 and the radio receiver 1010 is that it minimises the saturation of the radar receiver antennas 1004.

It will be appreciated that FIG. 10 is a simplistic diagram which does not show any refraction caused by the windscreen 1010. It should also be appreciated that only one radar receiver 1004 of the respective pair of radar receiver is shown in this figure because that is sufficient to describe the effect of minimising saturation of it by reducing back reflections. Moreover, only one of the two radar units (532 and 534) is shown to simplify the image. Of course, the above applies to both radar units.

The application refers the security system being used in a car. However, it must be appreciated that the security system is not limited to use in a car only; any vehicle may be used such as, a lorry, a taxi, a bus, or a mini bus. Although the schematic illustration of FIG. 1 refers to a wired connection 300, the connection between respective parts, 100 and 200, of the security system may be a wireless connection.

The communication ports 536 and 518 are described as USB connection ports, however, any suitable connection may be used such as HDMI, RS485, ethernet, and the like. It may also be hard wired and not removeable.

It will be appreciated that the devices shown in FIGS. 3a-c, and 4a-b are just one implementation of a security device. For example, the first device is not limited to the pendant shape or the round mounting end. Other solutions may be possible to provide a flexible mounting system allowing a range of adjustment for the camera 102, such as pivotable lenses in the case of a fixed mount. A person skilled in the art would appreciate there are many other systems that could be employed.

The 3M™ sticky pad 107 could be any such means to fix the first device 100 to a support structure (e.g. windscreen), such as suction pad, glue pad and the like.

Although one or more embodiments have been described using 4 k video resolution, other suitable resolution may be used.

It will be appreciated by a person skilled in the art that the wired connection 110/412 is just one example of how two devices may be connected so as to transfer data and video between them. Of course, other examples may include wireless connections such as Bluetooth, WiFi, 4G, radio frequency (RF), and the like.

The security system 10 discloses the use of RADAR technology for object detection. Other forms of object detection and ranging can be used such as LIDAR, infra red, or time of flight sensors.

The angle of which the first radar transmitter 602 and second radar transmitter 604 degrees is mounted relative to the direction 104 towards the external area in front of the vehicle to which it may be mounted is described as 60 degrees. However, it should be appreciated that this angle is to achieve the optimum overlap between the two radar transmitters and other angles may be used to provide a sub optimal overlap if desired. Moreover, the angle is dependent on the choice of motion detection and ranging modules used and other angles may be chosen to provide optimal overlap in the forward facing direction.

FIG. 10 shows the first device 100 relative to a windscreen 1002 and the relative positions of the transmitter and receivers. However, it should be appreciated that this also applies to the second device 200 as it is also desirable to minimise back reflections from the transmitted signal that is detected by the receiver.

The first radar transmitter 602 of the first radar unit 532 and the second radar transmitter 604 of the second radar unit 534 are not limited to any such transmitter. However, examples of some may be PCB radar transmitters, patch or microchip antennas, flexible PCB radar antennas.

In the specific description of FIG. 10, the transmitted radar signal passes through a windscreen or windshield of a vehicle in which the device 100 may be mounted. However, the device may be mounted behind any other protective surface such as a headlamp or headlight outer casing.

It will be understood by those skilled in the art that the drawings are merely diagrammatic and that further items of equipment may be required in a commercial apparatus. The position of such ancillary items of equipment forms no part of the present invention and is in accordance with conventional practice in the art.

Insofar as embodiments of the invention described above are implementable, at least in part, using a software-controlled programmable processing device such as a general purpose processor or special-purposes processor, digital signal processor, microprocessor, or other processing device, data processing apparatus or computer system it will be appreciated that a computer program for configuring a programmable device, apparatus or system to implement methods and apparatus is envisaged as an aspect of the present invention. The computer program may be embodied as any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as, Liberate, OCAP, MHP, Flash, HTML and associated languages, JavaScript, PHP, C, C++, Python, Nodejs, Java, BASIC, Perl, Matlab, Pascal, Visual BASIC, ActiveX, assembly language, machine code, and so forth. A skilled person would readily understand that term "computer" in its most general sense encompasses programmable devices such as referred to above, and data processing apparatus and computer systems.

Suitably, the computer program is stored on a carrier medium in machine readable form, for example the carrier medium may comprise memory, removable or non-removable media, erasable or non-erasable media, writeable or re-writeable media, digital or analog media, hard disk, floppy disk, Compact Disk Read Only Memory (CD-ROM), Company Disk Recordable (CD-R), Compact Disk Rewriteable (CD-RW), optical disk, magnetic media, magneto-optical media, removable memory cards or disks, various types of Digital Versatile Disk (DVD) subscriber identity module, tape, cassette solid-state memory.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, one or more features of different embodiments may be combined to create further embodiments not specifically described herein, and any one or more features may be combined consistent with their technical and operational compatibility. To the extent that one or more features from respective embodiments may not be combined without being inconsistent with the technical and/or operational compatibility such features from respective embodiments may be selected for combination which do not have such technical and/or operational compatibility. All such embodiments are contemplated within the scope of this disclosure.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

In view of the foregoing description, it will be evident to a person skilled in the art that various modifications may be made within the scope of the invention.

We claim:

1. An in-vehicle security device mountable to a surface to a rear of a rear-view mirror of a vehicle, comprising:
   a first image capture device configured to receive images in a first direction relative to the security device;
   a second image capture device facing a second direction, the second direction different from the first direction; and
   a first object detection module configured to detect the presence of an object exterior to a vehicle in which the security device may be mounted;
   wherein the first image capture device and second image capture device are arranged to begin capturing images and/or video responsive to the first object detection module detecting the presence of an object exterior to a vehicle in which the security device may be mounted; and
   wherein the second image capture device is arranged to comprise a field of view that extends beyond the rear view mirror into a cabin of the vehicle.

2. An in-vehicle security device according to claim 1, further comprising a second object detection module to detect the presence of an object exterior to a vehicle in which the security device may be mounted.

3. An in-vehicle security device according to claim 2, wherein the first object detection module and the second object detection module are arranged to have overlapping fields of view with the field of view of the first image capture device.

4. An in-vehicle security device according to claim 2, wherein the first object detection module is oriented at a first angle with respect to the direction of the field of view of the first image module and the second object detection module is oriented at a second angle with respect to the direction of the field of view of the first image module, the second angle being different to the first angle.

5. An in-vehicle security device according to claim 4 wherein the first angle and second angle are equal and opposite.

6. An in-vehicle security device according to claim 2, wherein the first object detection module and the second object detection module both each comprise:
at least one signal transmitter operative to emit an object ranging signal;
and at least two signal receivers for each at least one signal transmitter operative to receive a reflection of the emitted object ranging signal;
wherein the at least one signal transmitter and the at least two signal receivers for each at least one signal transmitter are disposed relative to each other to reduce reflection of the transmitted object ranging signal from a surface of a protective member proximal the at least one signal transmitter that the transmitted signal travels through.

7. An in-vehicle security device according to claim 5, further comprising an external housing and wherein the signal transmitters are arranged so as to minimise occlusion of the signal by features of the housing.

8. An in-vehicle security device according to claim 7, wherein the signal transmitters are arranged to be at a distance from the inner surface of the housing so as to minimise destructive interference of the signal by the housing.

9. An in-vehicle security device according to claim 8, wherein the distance is 0.6 mm.

10. An in-vehicle security device according to claim 1, wherein the security device is configured to be connected to a second device such that image data and motion data captured on the second device is transferrable to the first device.

11. An in-vehicle security device according to claim 1, wherein the motion detection module is a RADAR module.

12. An in-vehicle security device according to claim 1, further comprising an inertial measurement unit.

13. An in-vehicle security device according to claim 12, wherein the security system is configured to be operative in either a high power state or a lower power state responsive to an indication of a security threat by the inertial measurement unit.

14. An in-vehicle security device according to claim 13, further comprising a memory device and/or a data transfer unit;
and wherein the device stores measurement data from the first image capture device, second image capture device, and the object detection modules on the memory card and responsive to the indication of a security threat, transmitting the data to an external device.

15. An in-vehicle security device according to claim 1, wherein the second image capture device of the first device is a wide-angle lens.

16. An in-vehicle security device according to claim 1, configured to be pivotably mountable to a surface to the rear of a rear-view mirror of a vehicle.

17. A mount attachable to a surface to the rear of a rear-view mirror of a vehicle and configured to provide pivotable coupling of an in-vehicle security device according to claim 1 to the mount.

18. An assembly, comprising a mount according to claim 17 and an in-vehicle security device according to any preceding claim pivotably mounted to the mount.

19. A vehicle comprising a security device according to claim 1.

20. A vehicle comprising an assembly according to claim 18.

* * * * *